US011540157B2

(12) United States Patent
Zetterberg et al.

(10) Patent No.: US 11,540,157 B2
(45) Date of Patent: Dec. 27, 2022

(54) METHOD AND APPARATUS FOR UPDATING NEIGHBORING BASE STATION RELATIONS

(71) Applicant: Telefonaktiebolaget LM Ericsson (publ), Stockholm (SE)

(72) Inventors: Kristina Zetterberg, Linköping (SE); Pål Frenger, Linköping (SE); Pradeepa Ramachandra, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 233 days.

(21) Appl. No.: 16/765,513

(22) PCT Filed: Mar. 9, 2018

(86) PCT No.: PCT/EP2018/055894
§ 371 (c)(1),
(2) Date: May 20, 2020

(87) PCT Pub. No.: WO2019/105596
PCT Pub. Date: Jun. 6, 2019

(65) Prior Publication Data
US 2020/0288339 A1 Sep. 10, 2020

(30) Foreign Application Priority Data

Nov. 30, 2017 (EP) .................. PCT/EP2017/081033

(51) Int. Cl.
*H04W 24/10* (2009.01)
*H04W 76/16* (2018.01)
(Continued)

(52) U.S. Cl.
CPC ........... *H04W 24/10* (2013.01); *H04W 76/16* (2018.02); *H04W 80/06* (2013.01); *H04W 88/08* (2013.01)

(58) Field of Classification Search
None
See application file for complete search history.

(56) References Cited

U.S. PATENT DOCUMENTS

2011/0294527 A1 12/2011 Brueck et al.
2012/0329461 A1* 12/2012 Teyeb .................. H04W 36/08
455/437
(Continued)

FOREIGN PATENT DOCUMENTS

RU 2563590 C2 9/2015
WO 2018038653 A1 3/2018

OTHER PUBLICATIONS

Nokia, et al., "RAN supported TNL discovery for EN-DC", 3GPP TSG-RAN WG3 Meeting #97, Berlin, Germany, Aug. 21-25, 2017, R3-172996.
(Continued)

*Primary Examiner* — Chi H Pham
*Assistant Examiner* — Raul Rivas
(74) *Attorney, Agent, or Firm* — Coats & Bennett, PLLC

(57) ABSTRACT

A method in a serving radio base station (310, 510, 720) of a first radio access network, serving a wireless radio device (390, 590, 790), comprising or initiating the steps of:— receiving a measurement report, wherein the measurement report is based on a reference signal received by the wireless radio device (390, 590, 790) from a radio base station (321, 521, 711) in a further radio access network;—sending an identification request referring to the radio base station (321, 521, 711) in the further radio access network to at least one neighbor radio base station (311, 312, 320, 330, 522, 512, 530, 721, 722, 730) of the serving radio base station (310, 510, 720);—establishing a neighbor relation using the information about the identification of the radio base station (321,
(Continued)

521, 711) in the further radio access network, based on received identification information.

19 Claims, 13 Drawing Sheets

(51) Int. Cl.
    *H04W 80/06*     (2009.01)
    *H04W 88/08*     (2009.01)

(56) References Cited

U.S. PATENT DOCUMENTS

2014/0162660 A1    6/2014   Loborg et al.
2016/0315673 A1*  10/2016   Morita ................ H04L 1/1887

OTHER PUBLICATIONS

ZTE, "Stage2 TP of NR ANRF for TS38.300", 3GPP TSG RAN WG3 Meeting #96, Hangzhou, China, May 15, 2017, pp. 1-4, R3-171602, 3GPP.
ZTE, "Stage2 ANR TP for TS38.300", 3GPP TSG RAN WG3 NR#97, Berlin, Germany, Aug. 21, 2017, pp. 1-5, R3-172909, 3GPP.
Ericsson, "ANR for NSA NR", 3GPP TSG-RAN WG2 #98-AdHoc, Qingdao, China, Jun. 27, 2017, pp. 1-5, R2-1707Z83, 3GPP.
Ericsson, "On X2 TNL Address Discovery for Option 3", 3GPP TSG-RAN WG3 Meeting #97bis, Prague, Czech Republic, Oct. 9, 2017, pp. 1-10, R3-173935, 3GPP.
3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 13)", Technical Specification, 3GPP TS 36.300 V13.4.0, Jun. 1, 2016, pp. 1-310, 3GPP.

* cited by examiner

METHOD AND APPARATUS FOR UPDATING NEIGHBORING BASE STATION RELATIONS

TECHNICAL FIELD

The present invention relates to methods in a serving radio base station of a first radio access network, serving a wireless radio device and to corresponding devices and systems.

BACKGROUND

In wireless communication technologies, multiple radio base stations are deployed to provide radio connection to wireless radio devices. To coordinate the serving of wireless radio devices by the radio base stations it is important that each radio base station knows its neighboring radio base stations. With the introduction of Long Term Evolution (LTE), support for Automatic Neighbor Relation (ANR) was introduced, which removed or significantly decreased the manual configuration work for operators for setting-up neighbor relations between radio base stations, which are known as enhanced NodeB (eNB). In $3^{rd}$ Generation Partnership Project standard 3GPP TS 36.300 V13.4.0 the Automatic Neighbor Relation Function is described in more detail.

The ANR function is illustrated in FIG. 1. A wireless radio device or User Equipment (UE) is served by eNB in a cell A. The eNB serving cell A has an ANR function. As a part of the normal call procedure, the eNB instructs each UE to perform measurements on neighbor cells. The eNB may use different policies for instructing the UE to do measurements, and when to report them to the eNB. In step 1 the wireless radio device sends a measurement report regarding another eNB or cell B. This measurement report contains the Physical Cell-ID (PCI), but not its Enhanced Cell Global Identifier (ECGI). The serving eNB of cell A instructs the UE in step 2, using the newly discovered PCI as parameter, to read the ECGI, the Tracking Area Code (TAC) and all available Public Land Mobile Network (PLMN) ID(s) of the related neighbor cell. After measuring these values, the UE reports the detected ECGI to the serving eNB in step 3, and the eNB decides to add this neighbor relation. The eNB can use the PCI and ECGI to lookup a transport layer address to the new eNB, update the Neighbor Relation list, and, if needed, setup a new X2 interface towards this eNB.

FIG. 2 illustrates the ANR function in an eNB of an LTE network. The ANR function resides in the eNB and manages the conceptual Neighbor Relation Table (NRT). Located within ANR, the Neighbor Detection Function finds new neighbors and adds them to the NRT. ANR also contains the Neighbor Removal Function which removes outdated NRs. An existing Neighbor Relation from a source cell to a target cell could mean that the eNB which controls the source cell knows the ECGI/CGI and PCI of the target cell, has an entry in the Neighbor Relation Table for the source cell identifying the target cell and has the attributes in this Neighbor Relation Table entry defined, either by O&M or set to default values.

SUMMARY

The first standard release for $5^{th}$ Generation mobile network (5G, New Radio—NR) will be a non-standalone (NSA) NR network, utilizing the existing LTE radio access network and the Evolved Packet Core (EPC) network with the addition of a New Radio carrier. The NSA NR nodes will always have an LTE node as a master node. System information need not to be transmitted in NR, as the UE will not camp in NR. The LTE ANR solution relies on UE measurements of the global cell identifier, transmitted in the system information. In NSA NR networks, NR system information need not be transmitted and therefore the UE will not be able to read any global identifier of a NR radio base station. This means that the ANR procedure will not be possible to use for automatic NSA NR neighbor relation establishment.

It is therefore an object of the present invention to improve the automatic neighbor relation establishment in a wireless radio communication system. This object is achieved by the independent claims. Advantageous embodiments are described in the dependent claims.

According to a first aspect, a method in a serving radio base station of a first radio access network, serving a wireless radio device, is provided. The method comprising or initiating the step of receiving a measurement report, wherein the measurement report is based on a reference signal received by the wireless radio device from a radio base station in a further radio access network. The method further comprises the step of sending an identification request referring to the radio base station in the further radio access network to at least one neighbor radio base station of the serving radio base station. The method further comprises the step of establishing a neighbor relation using the information about the identification of the radio base station in the further radio access network, based on received identification information.

According to a further aspect, a method in a target radio base station of a radio access network is provided, wherein a wireless radio device is handed over from a source radio base station to said target radio base station. The method comprises the step of receiving, from the source radio base station, an enhanced identification request referring to a radio base station in a further radio access network, the enhanced identification request comprises the address of a radio base station which is requesting the identification of said radio base station in the further radio access network. The method further comprises the step of sending the identification information of said radio base station in the further radio access network to the radio base station which is requesting the identification of said radio base station in the further radio access network, if the radio base station in the further radio access network is known by the target radio base station as a neighboring radio base station, or forwarding the enhanced identification request to the further target radio base station if the radio base station in the further radio access network is not known by the target radio base station as a neighboring radio base station and if the wireless radio device is handed over to a further target radio base station.

According to a further aspect, a serving radio base station of a first radio access network, serving a wireless radio device is provided. The serving radio base station is configured to receive a measurement report, wherein the measurement report is based on a reference signal received by the wireless radio device from a radio base station in a further radio access network. The serving radio base station is further configured to send an identification request referring to the radio base station in the further radio access network to at least one neighbor radio base station of the serving radio base station. The serving radio base station is further configured to establish a neighbor relation using the information about the identification of the radio base station in the further radio access network, based on received identification information.

According to a further aspect, a serving radio base station of a first radio access network, serving a wireless radio device is provided. The serving radio base station comprises a processor and a memory, said memory contains instructions executable by said processor, whereby said serving radio base station is configured to initiate receiving a measurement report, wherein the measurement report is based on a reference signal received by the wireless radio device from a radio base station in a further radio access network. Said serving radio base station is further configured to initiate sending an identification request referring to the radio base station in the further radio access network to at least one neighbor radio base station of the serving radio base station; and establishing a neighbor relation using the information about the identification of the radio base station in the further radio access network, based on received identification information.

According to a further aspect, a target radio base station of a radio access network is provided, wherein a wireless radio device is handed over from a source radio base station to said target radio base station, the target radio base station is configured to initiate receiving, from the source radio base station, an enhanced identification request referring to a radio base station in a further radio access network, the enhanced identification request and the address of a radio base station which is requesting the identification of said radio base station in the further radio access network. The target radio base station is further configured to initiate sending the identification information of said radio base station in the further radio access network to the radio base station which is requesting the identification of said radio base station in the further radio access network if the radio base station in the further radio access network is known by the target radio base station as a neighboring radio base station. The target radio base station is further configured to initiate forwarding the enhanced identification request to the further target radio base station if the radio base station in the further radio access network is not known by the target radio base station as a neighboring radio base station and if the wireless radio device is handed over to a further target radio base station.

According to a further aspect, a target radio base station of a radio access network is provided, wherein a wireless radio device is handed over from a source radio base station to said target radio base station. The target radio base station comprises a processor and a memory, said memory contains instructions executable by said processor, whereby said target radio base station is configured to initiate receiving, from the source radio base station, an enhanced identification request referring to a radio base station in a further radio access network, the enhanced identification request and the address of a radio base station which is requesting the identification of said radio base station in the further radio access network. The target radio base station is further configured to initiate sending the identification information of said radio base station in the further radio access network to the radio base station which is requesting the identification of said radio base station in the further radio access network if the radio base station in the further radio access network is known by the target radio base station as a neighboring radio base station, and forwarding the enhanced identification request to the further target radio base station if the radio base station in the further radio access network is not known by the target radio base station as a neighboring radio base station and if the wireless radio device is handed over to a further target radio base station.

The present invention also concerns computer programs comprising portions of software codes or instructions in order to implement the method as described above when operated by at least one respective processing unit of a user device and a recipient device. The computer program can be stored on a computer-readable medium. The computer-readable medium can be a permanent or rewritable memory within the user device or the recipient device or located externally. The respective computer program can also be transferred to the user device or recipient device for example via a cable or a wireless link as a sequence of signals.

BRIEF DESCRIPTION OF THE FIGURES

In the following, the invention will further be described with reference to exemplary embodiments illustrated in the figures, in which.

DETAILED DESCRIPTION

Figure 1:
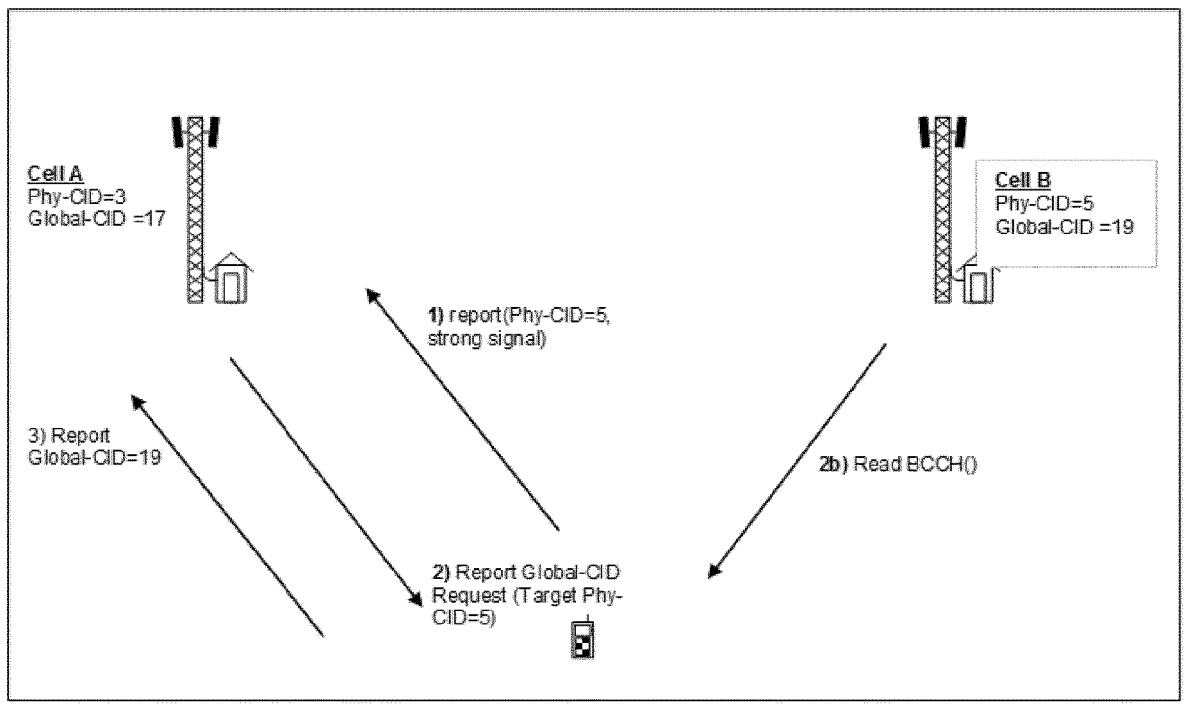
FIG. 1 shows an exemplary sequence diagram of an existing Automatic Neighbor Relation Function in LTE.
Figure 2:
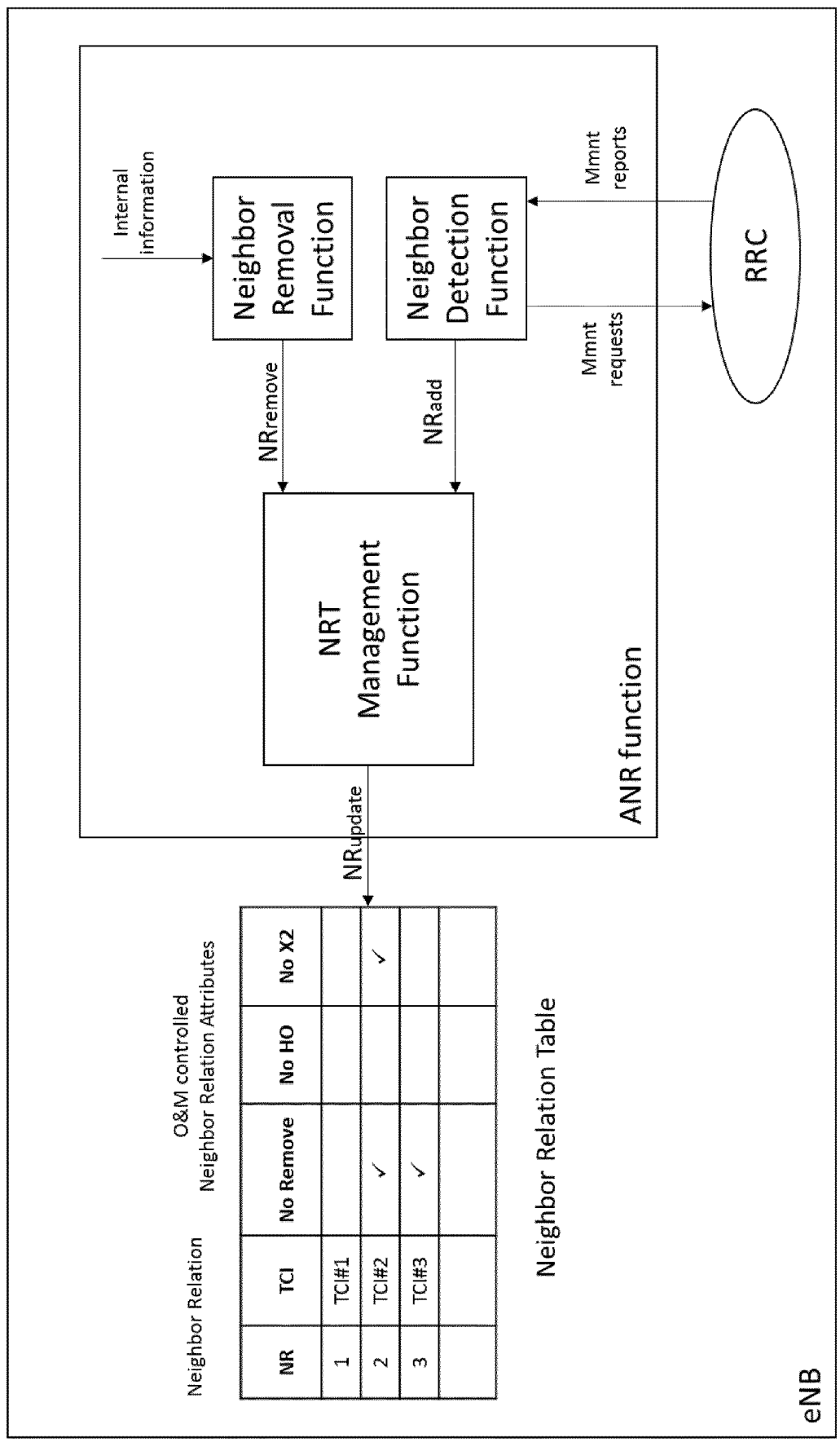
FIG. 2 shows a schematic illustration of an existing implementation of the ANR function in a eNodeB.

In the below, for purposes of explanation and not limitation, specific details are set forth in order to provide a thorough understanding of the present invention. It will be apparent to one skilled in the art that the present invention may be practiced in other embodiments that depart from these specific details. For example, although the exemplary embodiments are described in connection with LTE/5G (New Radio) standard terminology to illustrate the present invention, they are equally applicable to other kinds of mobile communication systems. Also, the invention may be practiced in any network to which mobile users or mobile devices may attach.

Those skilled in the art will further appreciate that the functions explained herein below may be implemented using hardware circuitry, software means, or a combination thereof. The software means may be in conjunction with a programmed microprocessor or a general-purpose computer, using an Application Specific Integrated Circuit (ASIC) and/or Digital Signal Processors (DSPs). It will also be apparent that when the present invention is described as a method, it may also be embodied in a computer processor and a memory coupled to the processor, wherein the memory is encoded with one or more programs that perform the method when executed by the processor.

Within the context of the present application, a User Equipment (UE) or wireless radio device may be any device intended for accessing services via an access network and configured to communicate over the access network. For instance, the UE or wireless radio device may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The UE or wireless radio device may be a portable, pocket-storable, hand-held, computer-comprised, or vehicle-mounted mobile device, enabled to communicate voice and/or data, via a wireless or wireline connection.

Within the context of the present application, the term "wireless radio communication network" or short "network" may particularly denote a collection of nodes or entities, related transport links, and associated management needed for running a service, for example a telephony service or a packet transport service. Depending on the service, different node types or entities may be utilized to realize the service. A network operator owns the communication network and offers the implemented services to its subscribers. Typical examples of a communication network are radio access network (such as 2G, GSM, 3G, WCDMA, CDMA, LTE, 5G or New Radio, WLAN, Wi-Fi), mobile backhaul network, or core network such as IMS, CS Core, PS Core or EPC.

Within the context of the present application the term "cell" may typically belongs to a network node. In particular, the cell belongs to an enhanced NodeB (eNB) which is referred to as "LTE" in the embodiments, or belongs to a radio base station of a New Radio (NR) access network which is referred to as "NR" in the embodiments. The term "NR" has been selected to identify a radio base station according to the $5^{th}$ generation mobile network or $5^{th}$ generation wireless system, abbreviated as "5G", which is the proposed next telecommunication standard beyond the 4G standard. A radio base station according to the 5G standard may also be denoted as a gNB.

Communication described to take place between cells can take place between the network nodes or radio base stations corresponding to these cells, whereas neighbor relations are typically maintained between cells. In the below, the term cell could be replaced by radio base station/node or vice versa.

The illustration in the drawing is schematic. In different drawings, similar or identical elements are provided with the same reference signs or with reference signs which are different from one another in the first digit.

Figure 3:
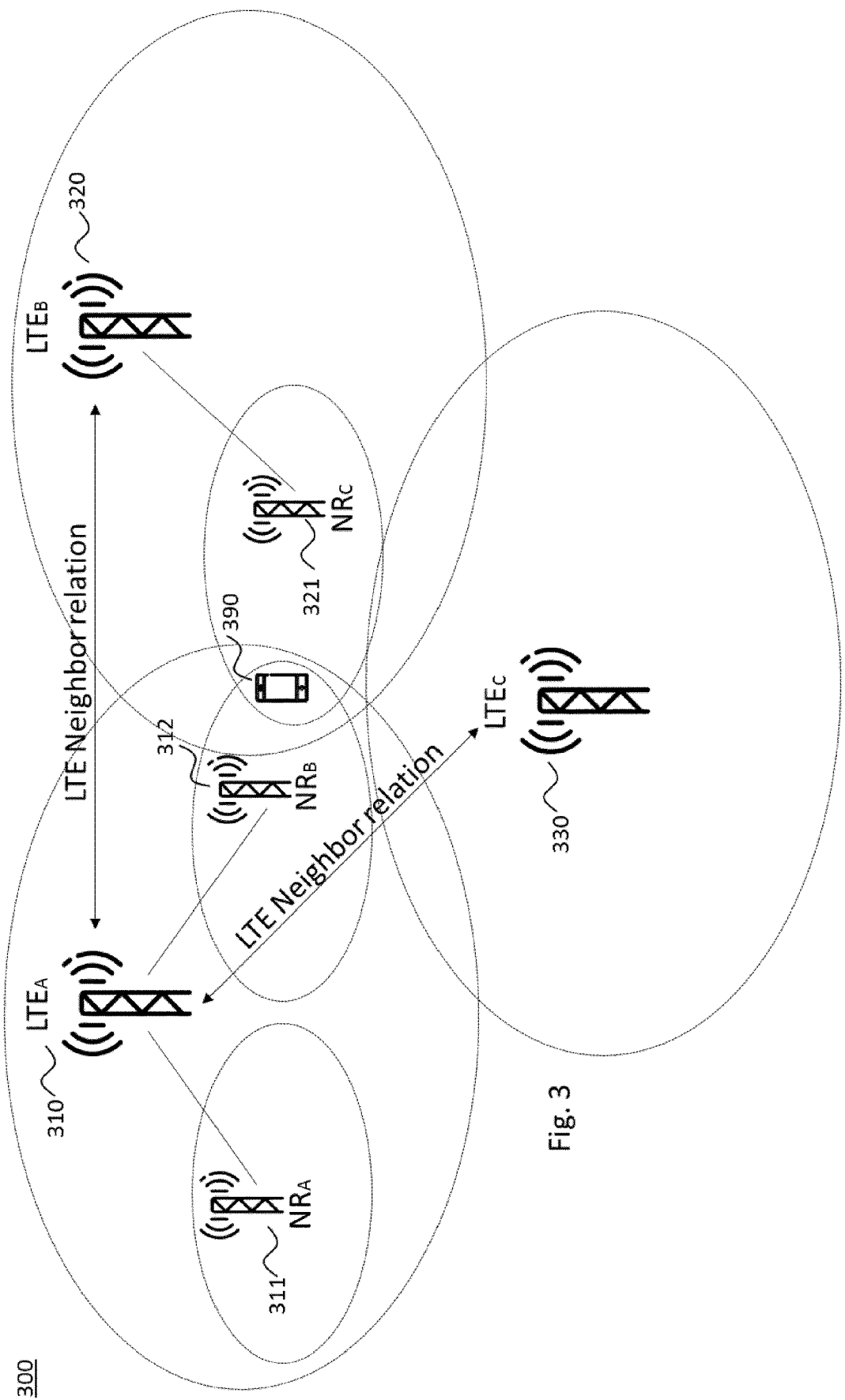
FIG. 3 shows a schematic illustration of a first embodiment of a wireless communication network.

FIG. 3 depicts a first embodiment of the invention. The scenario of FIG. 3 shows three LTE radio base stations or eNBs $LTE_A$ 310, $LTE_B$ 320 and $LTE_C$ 330 serving respective cells which are depicted by oval-shaped circles. Between $LTE_A$ 310 and $LTE_B$ 320 a LTE Neighbor relation is established. In other words, the radio base station $LTE_A$ 310 knows the address of $LTE_B$ 320 and vice versa. The Neighbor Relation Table of $LTE_A$ 320 may comprise information, like the address of $LTE_B$. It is further assumed that $LTE_A$ 310 is connected via a specific interface with $LTE_B$ 320 to exchange control data. The same situation applies for the relation between radio base stations $LTE_A$ 310 and $LTE_C$ 330. FIG. 3 further illustrates three radio base stations which may work according to the new radio standard 5G and are referred to as $NR_A$ 311, $NR_B$ 312 and $NR_C$ 321. However, it may also be possible that all radio base stations 310, 320, 330, 311, 312, 321 are working according to the same standard (e.g. LTE).

According to an embodiment, which may be implemented in a Non-Standalone New Radio (NSA-NR) scenario, all three radio base stations $NR_A$ 311, $NR_B$ 312 and $NR_C$ 321 may have been associated to respective LTE eNBs, wherein in this embodiment radio base stations $NR_A$ 311 and $NR_B$ 312 are associated to radio base station $LTE_A$ 310 and $NR_C$ 321 is associated to radio base station $LTE_B$ 320. The association may refer to the ability of the LTE cell or eNB to provide the system information corresponding to the NR cell or base station/gNB. The NR radio base station may work according to a different radio access technology than the LTE radio base stations $LTE_A$ 310, $LTE_B$ 320 and $LTE_C$ 330. The cells of the NR base stations are also represented by oval circles to show the coverage of each cell or radio base station. A wireless radio device 390 is shown in a coverage area of $LTE_A$ 310, $NR_B$ 312, $NR_C$ 321 and $LTE_B$ 320. It is assumed that the wireless radio device or UE 390 is served by the radio base station $LTE_A$ 310 as the master radio base station in a first radio access network. The connection between the serving radio base station $LTE_A$ 310 and the wireless radio device 390 may be a Radio Resource Control (RRC) connection. In this embodiment of FIG. 3, the UE 390 receives reference signals from a radio base station $NR_C$ 321 which can be named as a radio base station in a further radio access network. $NR_C$ 321 is also currently not known by $LTE_A$ 310. In other words, there is no neighbor relation established between $LTE_A$ 310 and $NR_C$ 321. The reference signals from $NR_C$ 321 can also be named as synch signals or synchronization signals. When receiving the synchronization signals or reference signals from said radio base station, the UE 390 is not aware of the identity of that radio base station. This specific radio base station may not be on the neighbor list of the UE 390. Upon hearing the unknown $NR_C$ 321, the UE or wireless radio device 390 will inform its serving base station $LTE_A$ 310 that it has audibility of $NR_C$ 321. This can be done via a measurement report which is based on the reference signal received from the radio base station 321 in the further radio access network.

According to one embodiment the wireless radio device or UE 390 is served in addition by a second radio base station $NR_B$ 312 of a second radio access network. The wireless radio device 390 may be served by the serving radio base station $LTE_A$ 310 and by a second radio base station $NR_B$ 312 of a second radio access network in parallel. In a further embodiment which may be the NSA NR scenario, the serving radio base station $LTE_A$ 310 serves the wireless radio device or UE 390 with control data only, wherein the connection between the second radio base station $NR_B$ 312 and the wireless radio device 390 is only for the distribution (sending and receiving) of user data in Uplink (UL) and Downlink (DL). However, it may also be possible that some control data is also sent on this connection between the second radio base station $NR_B$ 312 and the wireless radio device 390. According to one embodiment the second radio access network is of a different radio access technology then the radio access technology of the serving radio base station 310. It may be possible that the serving radio base station 310 is an eNB in an LTE network or in an enhanced LTE network and the second radio base station is a gNB or Next Generation NodeB of a 5G access network.

According to one embodiment the measurement report can be sent from the wireless radio device 390 via the second radio base station $NR_B$ 312 to the serving radio base station $LTE_A$ 310 which results in that the measurement report is received by the serving radio base station 310 from the second radio base station 312. This will reduce the resource utilization in the PCCH between the serving eNB 310 and the UE 390. It may also be possible that the measurement report is directly sent to the serving radio base station $LTE_A$ 310 by the wireless radio device 390.

Upon receiving this audibility report or measurement report the serving radio base station $LTE_A$ 310 will check if the radio base station 321 in the further radio access network is known. If the radio base station 321 in the further radio access network is not known by the serving radio base station 310, an identification request referring to the radio base station 321 in the further radio access network is sent to at least one neighbor radio base station 320, 330, 311 of the serving radio base station 310. If the serving radio base station 310 receives the measurement report from a second radio base station, like $NR_B$ 312 in this embodiment, it may not send the identification request to this specific radio base station 312. It may be possible to send the identification request only to selected neighboring radio base stations 320, 330 if e.g. the measurement report includes LTE related measurements, or to send the identification request to all neighboring radio base stations 320, 330 and 311, excluding the radio base station 312 from which the report may have been received. The sending of an identification request towards neighboring radio base stations can be executed on a specific interface between the radio base stations or via the non-depicted core network. By requesting information from other radio base stations the radio link between the wireless radio device 390 and the serving radio base station 310 will be decongested because the wireless radio device 390 does not need to take any further actions to retrieve any further information from the detected radio base station in the further radio access network.

The identification request or cell identification request may comprise some information for the neighboring radio base stations to be able to identify the requested radio base station. It may be possible to include a fingerprint from the received reference signal to the identification request to make it possible for a neighboring radio base station 320 which knows said radio base station 321 in the further radio access network to link the requested identity to said radio base station 321 in the further radio access network. If a neighboring radio base station does not know the requested identity of the radio base station 321 in the further radio access network then this neighboring radio base station may answer the identification request with a negative acknowledgement (NACK). In the embodiment of FIG. 3, $LTE_C$ 330 may not have any knowledge about the requested identity of the radio base station $NR_C$ 321 in the further radio access network. In a scenario in which the radio access technology of $NR_C$ 321 is different to the radio access technology of the neighboring radio base station 330 (and also the neighboring radio base station 320) the chance is high that even if the radio base stations are closely located in a specific region, they are not aware of their neighbor relation. If the scenario in FIG. 3 refers to a NSA NR scenario, $NR_C$ 321 is a gNB of a different radio access technology than the radio access technology of $LTE_A$ 310. In this embodiment, $NR_C$ 321 is only associated to $LTE_B$ 320—but not to $LTE_C$ 330. It may also be possible that $LTE_C$ 330 or $NR_C$ 321 are newly introduced base stations which did not have the time yet to establish all neighbor relations. If $LTE_A$ 310 knows that a neighbor radio base station is not aware of the identity and address of the requested radio base station in the further radio access network (e.g. based on a received NACK response) it may later on use this information to provide the address detail only to said neighbor radio base station (e.g. $LTE_C$ 330) if available. This will prevent the network from sending information to nodes which are already aware of said information.

After the serving radio base station $LTE_A$ 310 receives the identification of the radio base station $NR_C$ 321 in the further radio access network, it establishes a neighbor relation based on the information of said radio base station $NR_C$ 321 in the further radio access network. The advantage of having the LTE radio base stations as a backbone for determining neighbor relations, additional resources for transmitting system information from the NSA NR nodes is not needed and will reduce the use of limited Physical Random Access Channels (PRACH) resources which are reserved for ANR operations in NSA deployments In one embodiment, the NRT of $LTE_A$ 310 is updated with the information related to the radio base station $NR_C$ 321. The information about the identification may be a Transport Network Layer address of the radio base station $NR_C$ 321. The serving radio base station 310 may now be able to contact the radio base station $NR_C$ 321 in the further radio access network directly or via the neighboring base station $LTE_B$ 320 from which it receives the identification information.

In a further embodiment, the serving radio base station $LTE_A$ 310 sends a request for updating the neighbor relation information (e.g. the NRT) to its second radio base station $NR_B$ 312. It may also be possible to send this request to any other neighboring radio base station. In one further embodiment, the request for updating the neighbor relation is only sent to the neighboring base stations which have answered the identification request with a negative response or which have sent no answer at all.

Figure 4:
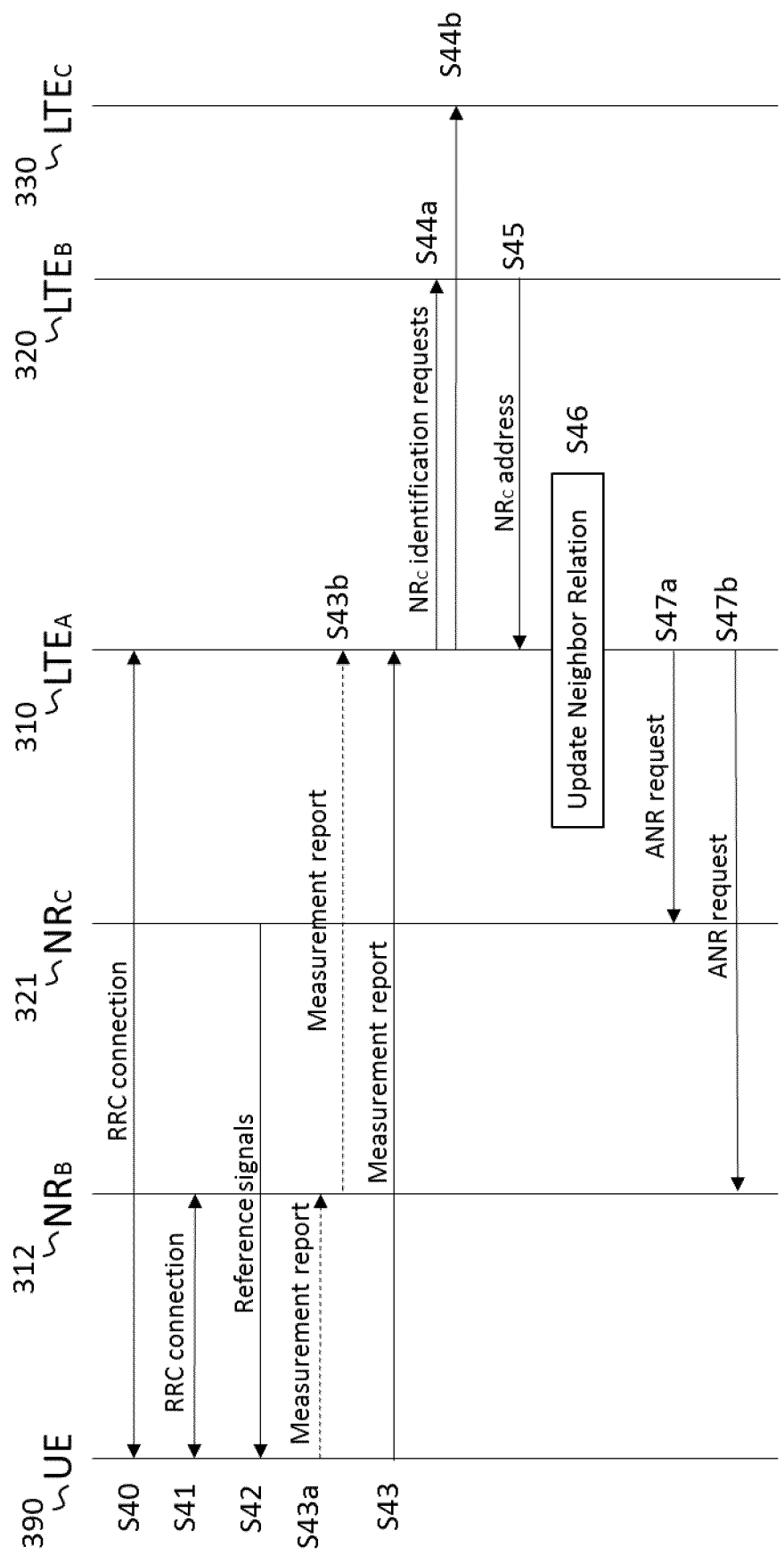
FIG. 4 shows an exemplary sequence diagram related to the first embodiment of the wireless communication network.

FIG. 4 shows an exemplary sequence diagram related to the first embodiment of the non-standalone New Radio network. In a first step S40 an RRC connection is established between the UE 390 and $LTE_A$ 310 which is the serving radio base station of UE 390. According to one embodiment a further RRC connection is established between the UE 390 and a second radio base station $NR_B$ 312 of a second radio access network. The serving radio base station 310 and the second radio base station 312 may work according to different radio access technologies (e.g. LTE and 5G). In step S42 the UE 390 receives a reference signal from a radio base station $NR_C$ 321 of a further radio access network. In a next step S43 a measurement report is sent from the UE 390 to the serving radio base station $LTE_A$ 310 based on reporting conditions. In a further embodiment, this measurement report may also be sent first to the second radio base station $NR_B$ 312 in step 43*a* and is forwarded in step 43*b* to the serving radio base station $LTE_A$ 310. In a next step S44*a*/S44*b* the serving radio base station $LTE_A$ 310 sends identification requests to its neighboring radio base stations $LTE_B$ and $LTE_C$. It may also be possible to send the identification requests to neighboring NR nodes, like $NR_A$ 311 or $NR_B$ 312 which may be radio base stations of a different radio access technology than $LTE_A$ 310. As $LTE_B$ 320 is aware of the requested identity of $NR_C$ 321 it provides the $NR_C$ address to the requesting radio base station $LTE_A$ 310 in step S45. $LTE_C$ 330 is not aware of the identity of the requested radio base station in the further radio access network and may reply with an NACK or may not reply at all. $LTE_A$ 310 will update its Neighbor Relation information in a next step S46. This may be done by updating a NRT in the eNB 310. According to a further embodiment $LTE_A$ 310 may send an Automatic Neighboring Relation (ANR) Update Request to its Neighboring radio base stations, like $NR_B$ 312 and the new $NR_C$ 321 in steps S47a and S47b. It may also be possible to filter the sending of the ANR requests based on technology of radio access networks of the respective neighbor radio base stations.

Figure 5:
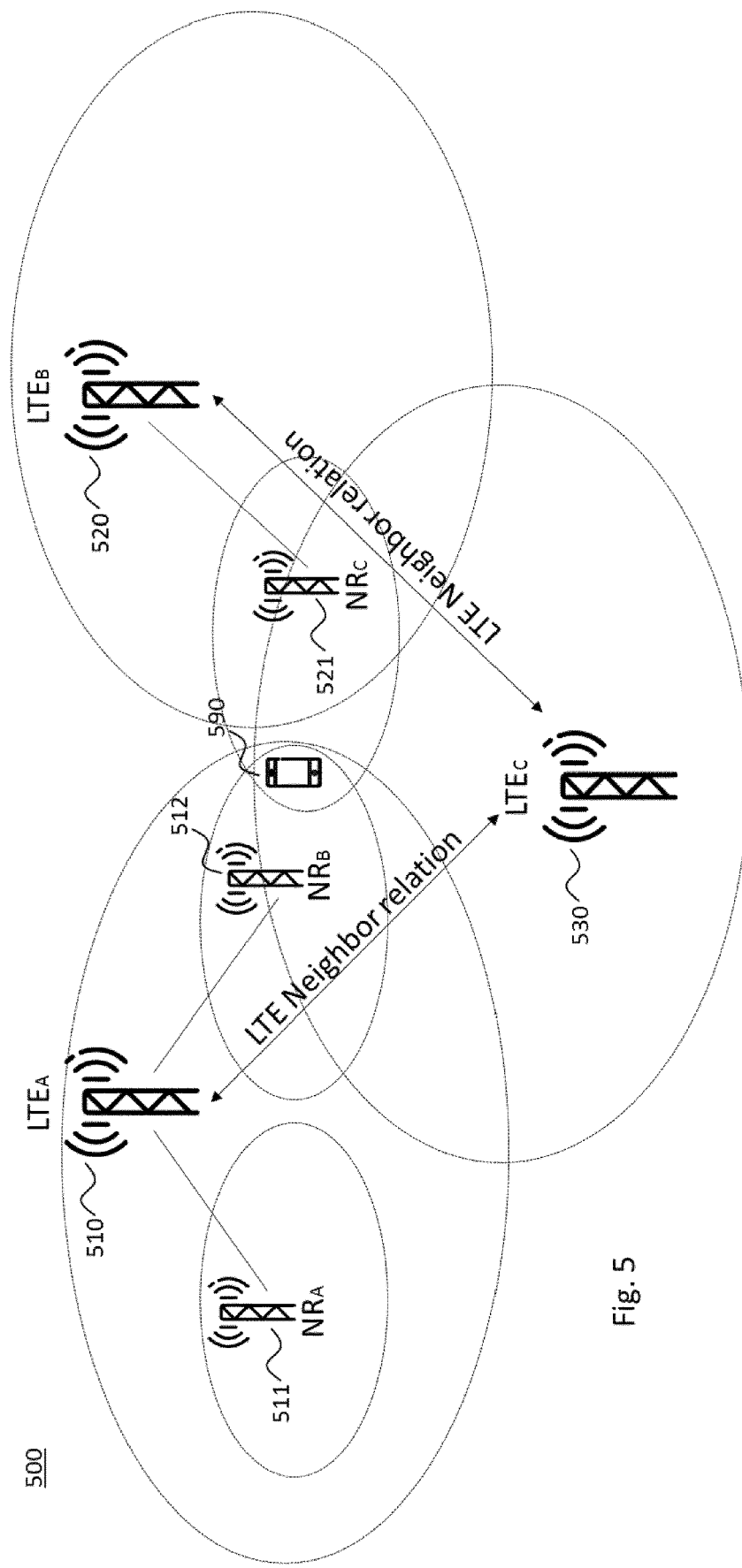
FIG. 5 shows a schematic illustration of a second embodiment of a wireless communication network.
Figure 6:
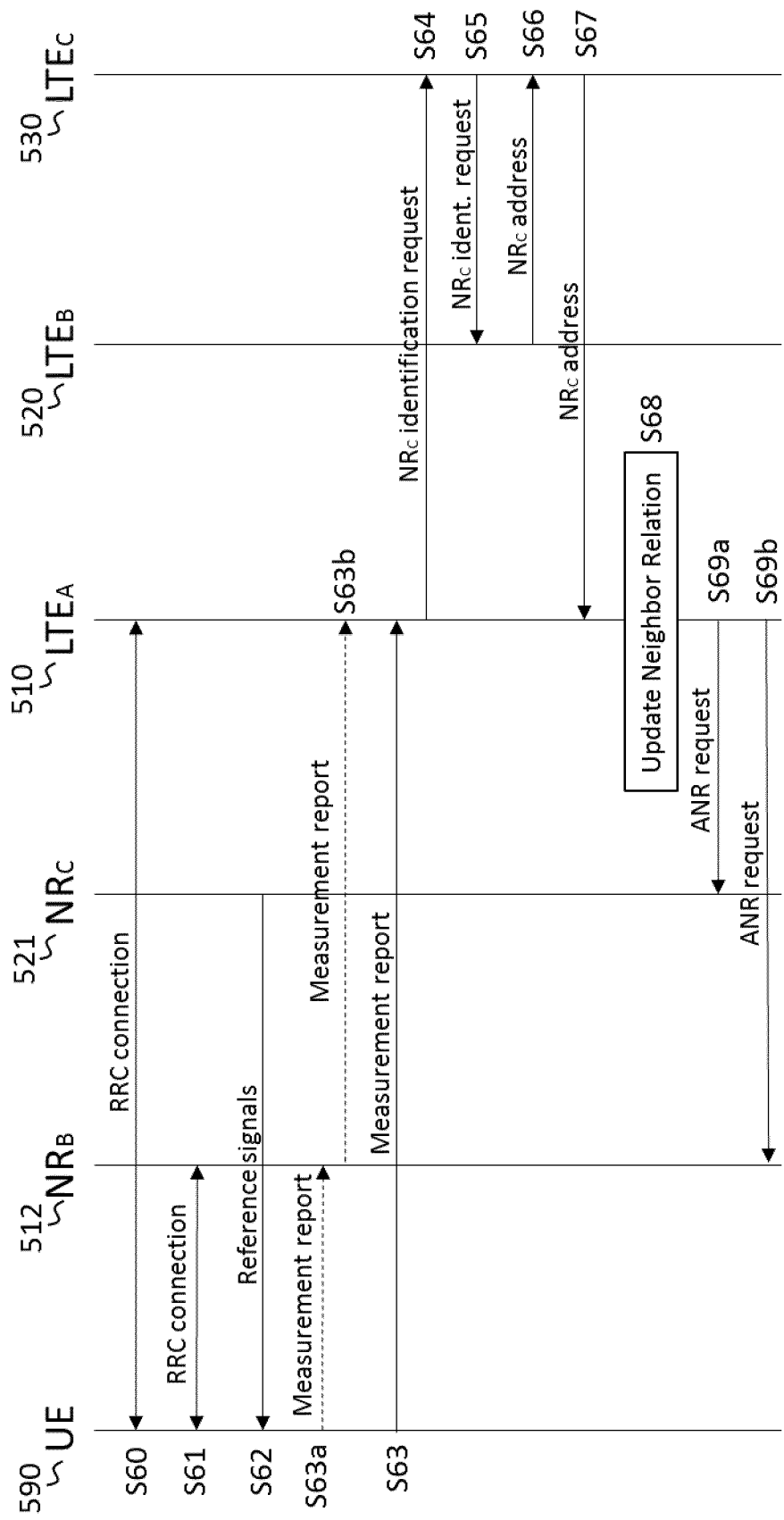
FIG. 6 shows an exemplary sequence diagram related to the second embodiment of the wireless communication network.

FIG. 5 shows a schematic illustration of a second embodiment of a radio access network. The difference between the first embodiment of FIG. 3 and the second embodiment in this figure is the fact that the serving $LTE_A$ 510 does not have a LTE neighbor relation with $LTE_B$ 520. Further $LTE_B$ 520 has a neighbor relation with $LTE_C$ 530 which is also different to the first embodiment. All other relations are unchanged. To request the identity of the radio base station $NR_C$ 521 in the further radio access network, $LTE_A$ 510 can only send the identification request to the known neighbor radio base station $LTE_C$ 530 if only radio base stations of the same radio access technology are requested. However, $LTE_C$ 530 is not aware of the identity of the radio base station $NR_C$ 521 in the further radio access network. As a result, none of the neighboring radio base stations to $LTE_A$ 510 will recognized $NR_C$ 521 upon receiving the $NR_C$ identification request. According to one embodiment a propagation method can be used to solve this problem. FIG. 6 shows one embodiment in which steps S60 to S63 are comparable to steps S40 to S43 of FIG. 4. In step S64 $LTE_A$ 510 will send the identification request to the only known neighboring radio base station $LTE_C$ 530 of the same radio access technology. According to the propagation embodiment, $LTE_C$ 530 will send the $NR_C$ identification request to its neighboring radio base station $LTE_B$ 520 in step S65. As $LTE_B$ 520 is aware of the requested address of $NR_C$ 521 it replies with the $NR_C$ address in step S66, which can be a Transport Network Layer (TNL) address of the radio base station $NR_C$ 521. In a next step $LTE_C$ may forward the $NR_C$ address to the requesting radio base station $LTE_A$ 510. In a further embodiment $LTE_C$ may update its neighbor relation information (e.g. the NRT) with the information about $NB_C$ 521. After receiving the NRC address from its neighboring node LTEC 530, LTEA 510 will proceed in the same manner as in embodiment one of FIGS. 3 and 4. Steps S68, S69a and S69b are comparable steps to S46, S47a and S47b.

In another embodiment $LTE_B$ 520 may also update its neighbor relation by adding the address and information about $LTE_A$ 510. This can be done based on the information in the $NR_C$ identification request, like the address of the original sender, $LTE_A$ 510. In this case, $LTE_B$ 520 may send the response directly to $LTE_A$ 510 which also allows $LTE_A$ 510 to update its neighbor relation information with the identity of $LTE_B$ 520.

The second embodiment may also be extended with more than one intermediate radio base station, like $LTE_C$ 530 in FIG. 5. Then the identification request may need to be forwarded further until it reaches a radio base station which knows the address of the requested radio base station in the further radio access network. In another embodiment, the ANR requests of FIG. 6 could also be sent by $LTE_C$ 530 or $LTE_B$ 520 to its neighboring radio base stations.

Figure 7:
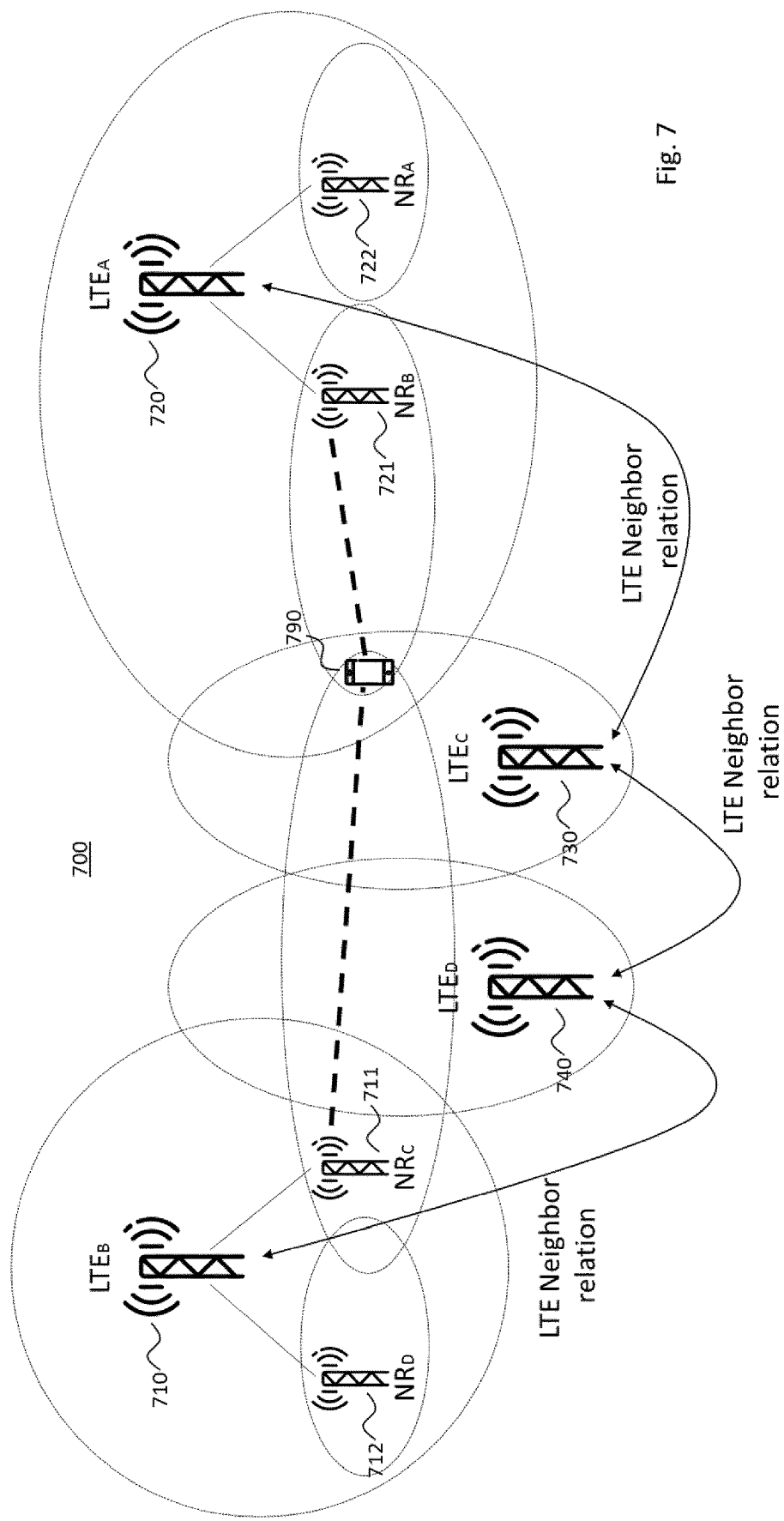
FIG. 7 shows a schematic illustration of a third embodiment of a wireless communication network.
Figure 8:
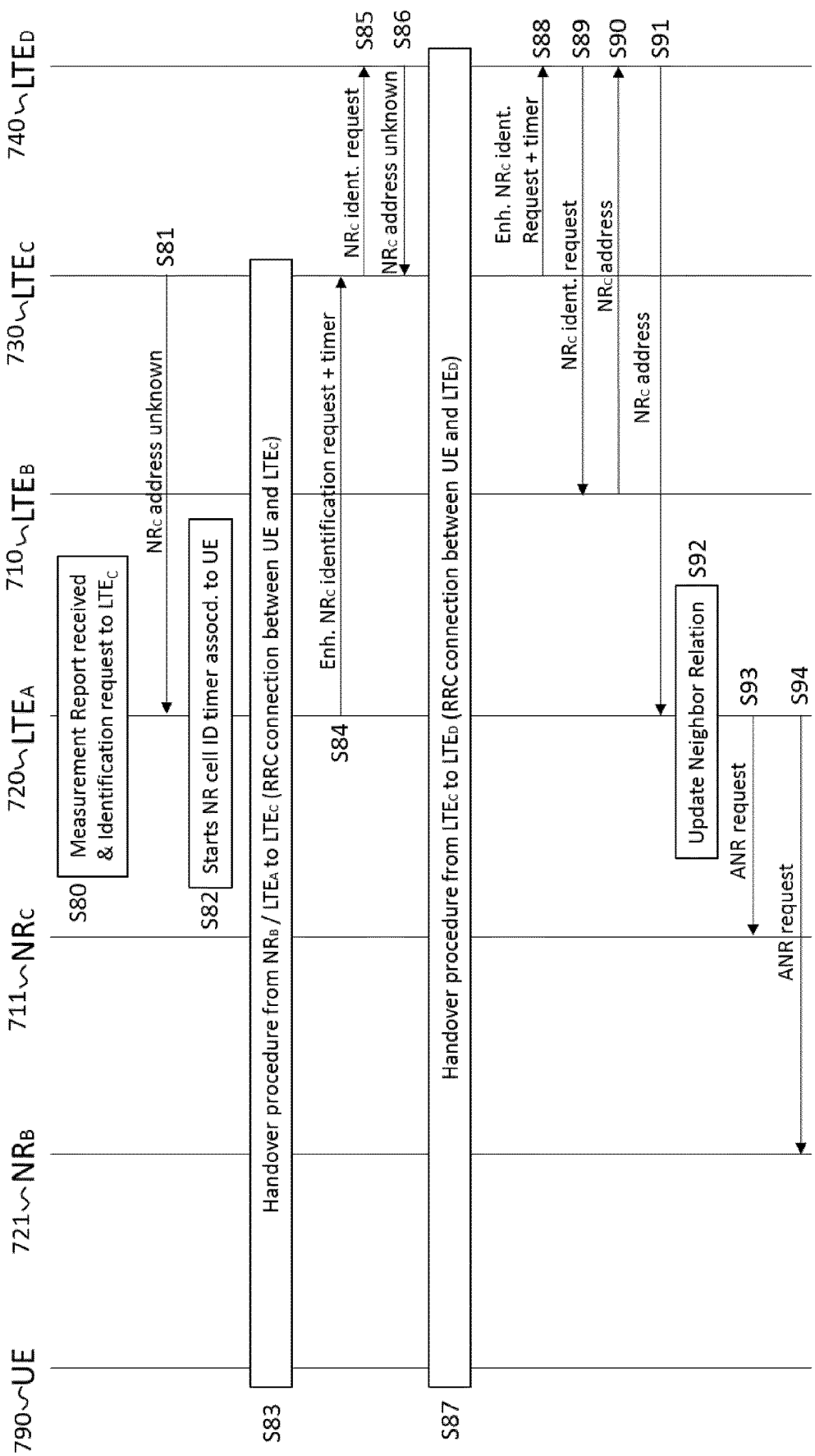
FIG. 8 shows an exemplary sequence diagram related to the third embodiment of the wireless communication network.

FIG. 7 and FIG. 8 now refers to a third embodiment in which a handover of the wireless radio device UE 790 is executed during the neighbor relation establishment. $LTE_A$ 720 is the serving radio base station for said wireless radio device UE 790. Radio base stations $NR_A$ 722 and $NR_B$ 721 are associated to $LTE_A$ 710 and can be gNB of a 5G network working with a different radio access technology than $LTE_A$ 720 and all other LTE radio base stations 710, 730 and 740. Further UE 790 is in the coverage area of a radio base station $NR_C$ 711 of a further radio access network. $NR_C$ 711 is associated with the radio base station $LTE_B$ 710 which does not have any neighbor relation to radio base station $LTE_A$ 720. A further radio base station NRD 712 is also associated with $LTE_B$ 710 but has no coverage with UE 790. Two radio base stations LTEC 730 and $LTE_D$ 740 are depicted in FIG. 7, wherein UE 790 is in the coverage area of $LTE_C$ 730. There are neighbor relations established between $LTE_A$ 720 and $LTE_C$ 730, as well as between $LTE_C$ 730 and $LTE_D$ 740 and between $LTE_D$ 740 and $LTE_B$ 710. In other words, these radio base stations may have a NRT which has an entry of the respective neighbor radio base station, like the TNL address so that these radio base stations are able to exchange control data via a specific link.

Assuming in step S80 that the serving cell also receives a measurement report from its UE 790 which is also in-line with the first and second embodiments, steps S40-S43 and steps S60 to S63. Further, assuming that $LTE_A$ has sent an $NR_C$ identification request to $LTE_C$ 730 which is the only neighboring radio base station for $LTE_A$ 720 which is answered by an indication NRC address unknown or NACK in step S81, the UE 790 has to be handed-over to another LTE radio base station which may be a result of a bad coverage or any other trigger from the network. In this embodiment, UE 790 is handed over from $LTE_A$ 710 as the previous serving cell to the target radio base station $LTE_C$ 730. This handover procedure is depicted as a single step S83 which comprises several steps for exchanging information between the UE 790, the source radio base station $LTE_A$ 720 and the target radio base station $LTE_B$ 730 for handing over the UE 790. In a next step S84 the target radio base station $LTE_C$ 730 receives an enhanced identification request from the source radio base station $LTE_A$ 720 from which the UE 790 has been transferred and which has also initiated the identification request, based on the measurement report from the UE 790. The enhanced identification request refers to the radio base station $NR_C$ 721 in the further radio access network and comprises the address of the radio base station which is requesting the identification of said radio base station in the further radio access network. In this case the radio base station which is requesting the identification of the radio base station in the further radio access network is the source radio base station $LTE_A$ 720. However, if there are several handovers of the UE 790 then the source radio base station of each handover may not be the same radio base station which requested the address of the radio base station $NR_C$ 711 in the further radio access network.

If the radio base station in the further radio access network is known by the target radio base station as a neighboring radio base station then the target base station sends the identification information of said radio base station in the further radio access network to the radio base station which is requesting the identification of said radio base station in the further radio access network. In the embodiment of FIGS. 7 and 8, the target base station $LTE_C$ 730 does not know the radio base station $NR_C$ 711 and is therefore not able to send the $NR_C$ address to the requesting radio base station $LTE_A$ 720. If the radio base station in the further radio access network $NR_C$ 721 is not known by the target radio base station $LTE_C$ 730 as a neighboring radio base station the target radio base station $LTE_C$ 730 may send a $NR_C$ identification request to its neighboring radio base stations (here $LTE_D$ 740) in step S85 and may receive a negative acknowledgment NACK or "$NR_C$ address unknown" answer from $LTE_D$ 740 in step S86 or may not receive any response. According to this embodiment the process of determining the address stops until a further handover to a new target radio base station $LTE_D$ 740 is executed in step S87. The "old" target radio base station $LTE_C$ 730 will then forward the enhanced identification request to the new target radio base station $LTE_D$ 740, still comprising the address of the requesting radio base station $LTE_A$ 720 in step S88. The new target radio base station $LTE_D$ 740 will then send an identification request in step S89 to its neighboring radio base station $LTE_B$ 710. In this case $LTE_B$ 710 knows the identity of the radio base station $NR_C$ 711 and answers with the identity or address of $NR_C$ 711 in step S90. $LTE_D$ 740 now knows the address of the radio base station in the further radio access network and is aware of the address of the requesting radio base station $LTE_A$ 720 from the enhanced identification request which comprises the address of the requesting radio base station, and sends the identity of $NR_C$ 711 to $LTE_A$ 720 in step S91. The next steps S92 to S94 are comparable to the steps of the first and second embodiment. It may of course be possible to have more or less handovers of the UE 790 which triggers the sending of the enhanced identification request to the target radio base station. The difference between the identification request and the enhanced identification request is that the enhanced identification request comprises in addition the address of the requesting radio base station which is not changed during the forwarding of this message to a further target radio base station after a further handover occurred. It may be possible that the enhanced identification request is send to the target radio base station during the handover process or as part of a handover. It may also be possible that the enhanced identification request is sent after the handover has been executed. This process allows to follow-up an automatic neighbor relation process even if the UE will be transferred to other serving radio base stations.

According to a further embodiment a timer is used to limit this process for a specific time. It may be possible to start a timer which is associated with the UE 790 which has sent the measurement report to its serving radio base station $LTE_A$ 720. The process of forwarding the enhanced identification request to a further target radio base station is then only executed if the time has not expired—or the timer is still running. The timer could be stopped after a specific time is over (the timer may have reached a specific limit) or if the address has been successfully determined. The timer value could be forwarded via the enhanced identification request to the new target radio base station which will then update the timer further. Therefore, it is secured that each new target radio base station is aware of the time which may limit the automatic neighbor relation process. The forwarding of the enhanced identification request to the new target radio base station may only be triggered if a negative response to the identification request has been received. In a further embodiment, a counter is set which is incremented or decremented each time an enhanced identification request is sent to a new target radio base station. The updated counter may always be included in the enhanced identification request and can be used instead or in addition to the timer value. If the counter reaches a pre-defined value the automatic neighbor relation determination process is stopped. For stopping this process, the counter may have reached value "0" if it is decremented from a pre-defined value or may have reached the pre-defined value if the counter has been started with value "0".

Figure 9:
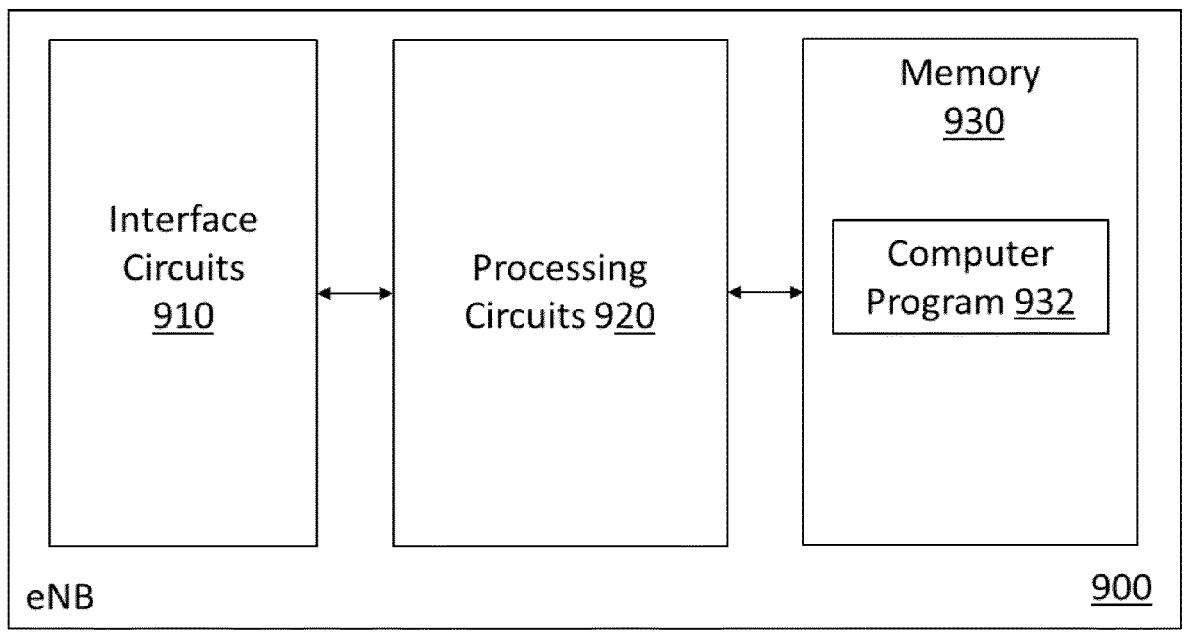
FIG. 9 shows a block diagram for illustrating functionalities of a serving radio base station according to an embodiment.

FIG. 9 shows a block diagram for illustrating functionalities of a serving radio base station or eNB 900 of a first radio access network, serving a wireless radio device according to an embodiment. The serving radio base comprises station is configured to initiate receiving a measurement report, wherein the measurement report is based on a reference signal received by the wireless radio device from a radio base station in a further radio access network. Receiving the measurement report may be done via Interface circuits 910. The eNB 900 is further configured to initiate sending an identification request referring to the radio base station in the further radio access network to at least one neighbor radio base station of the serving radio base station. The sending of the identification request may be done via Interface circuits 910. The eNB 900 is further configured to initiate establishing a neighbor relation using the information about the identification of the radio base station in the further radio access network, based on received identification information. The neighbor relation may be established via Processing circuits 920.

According to another embodiment, a serving radio base station 900 of a first radio access network, serving a wireless radio device is provided. The serving radio base station comprises a processor 920 and a memory 930, said memory 930 contains instructions executable by said processor 920 (e.g. computer program 932), whereby said serving radio base station 900 is configured to initiate receiving a measurement report, wherein the measurement report is based on a reference signal received by the wireless radio device from a radio base station in a further radio access network. Said serving radio base station 900 is further configured to initiate sending an identification request referring to the radio base station in the further radio access network to at least one neighbor radio base station of the serving radio base station; and establishing a neighbor relation using the information about the identification of the radio base station in the further radio access network, based on received identification information.

It is to be understood that the structure as illustrated in FIG. 9 is merely schematic and that the serving radio base station or eNB 900 may actually include further components which, for the sake of clarity, have not been illustrated, e.g., further interfaces. For example, multiple network interfaces could be provided which are configured to allow communication with different types of other nodes. Also, it is to be understood that the storage entity may include further types of program code modules, which have not been illustrated.

Moreover, it is to be understood that the above concepts may be implemented by using correspondingly designed software to be executed by one or more processors of an existing device, or by using dedicated device hardware. Also, the nodes as described herein may be implemented by a single device or by multiple devices, e.g., a device cloud or system of cooperating devices.

Figure 10:
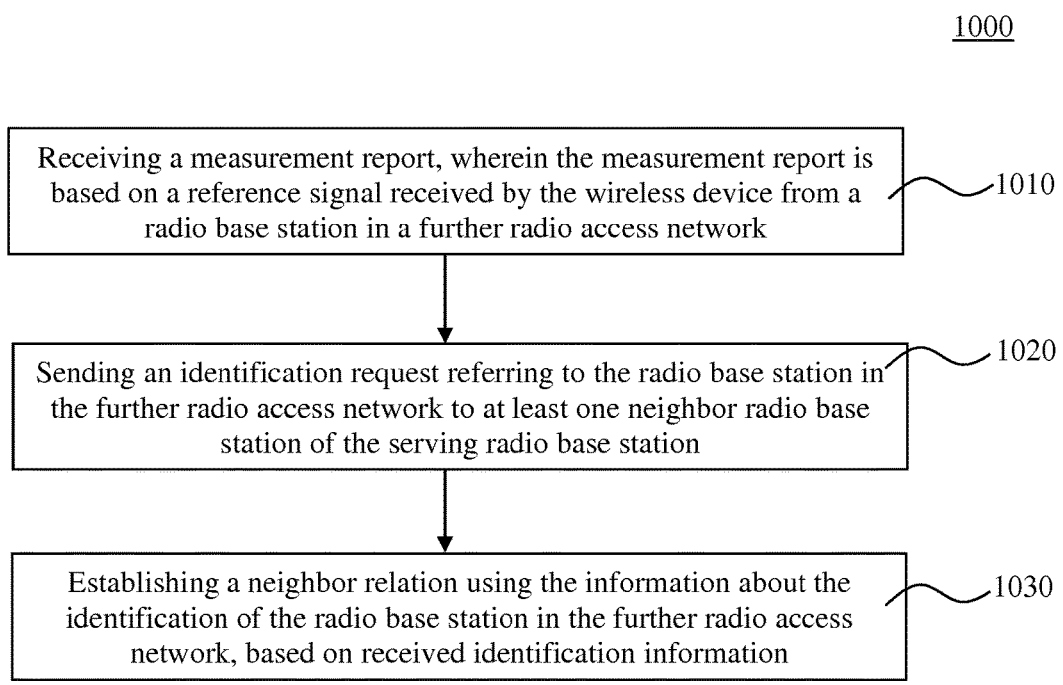
FIG. 10 shows a flowchart for illustrating a method according to an embodiment.

FIG. 10 shows a flowchart for illustrating a method 1000 which may be utilized for implementing the illustrated concepts in a serving radio base station of a first radio access network. The method may be performed by a serving radio base station which is responsible for providing access of a wireless radio device to a wireless communication network. The serving radio base station serves the wireless radio device and is configured to initiate receiving, in a step 1010 a measurement report, wherein the measurement report is based on a reference signal received by the wireless radio device from a radio base station in a further radio access network. The serving radio base station is further configured to initiate in step 1020 the sending of an identification request referring to the radio base station in the further radio access network to at least one neighbor radio base station of the serving radio base station, and to initiate in step 1030 establishing a neighbor relation using the information about the identification of the radio base station in the further radio access network, based on received identification information. If a processor-based implementation of the serving radio base station is used, the steps of the method may be performed by one or more processors of the radio base station. In such a case the radio base station may further comprise a memory in which program code for implementing the below described functionalities is stored.

Figure 11:
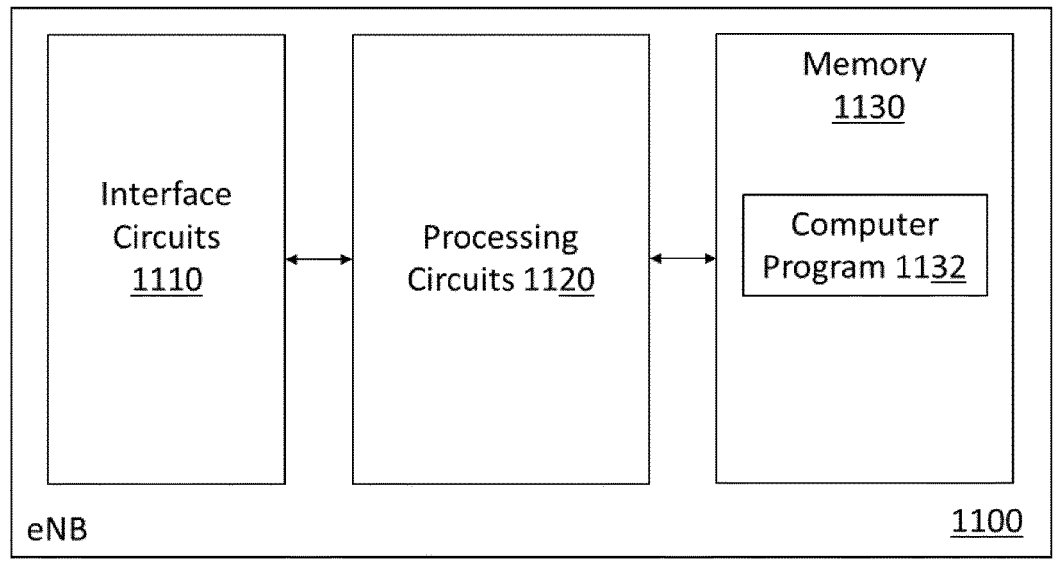
FIG. 11 shows a block diagram for illustrating functionalities of a target radio base station according to an embodiment.

FIG. 11 shows a block diagram for illustrating functionalities of a target radio base station or eNB 1100 of a radio access network according to an embodiment. A wireless radio device is handed over from a source base station to said target radio base station 1100. The target radio base station or eNB 1100 comprises interface circuits 1110 for receiving, from the source radio base station, an enhanced identification request referring to a radio base station in a further radio access network, the enhanced identification request comprises the address of a radio base station which is requesting the identification of said radio base station (321, 521, 711) in the further radio access network. The eNB 1100 further comprises processing circuits 1120 to check if the radio base station in the further radio access network is known by the target radio base station as a neighboring radio base station. If this check is positive, the interface circuits 1110 is configured to initiate sending the identification information of said radio base station (321, 521, 711) in the further radio access network to the radio base station which is requesting the identification of said radio base station (321, 521, 711) in the further radio access network. If the processing circuits 1120 determined that the radio base station in the further radio access network is not known by the target radio base station as a neighboring radio base station and if the wireless radio device is handed over to a further target radio base station, the interface circuits 1120 is configured to initiate forwarding the enhanced identification request to the further target radio base station.

According to another embodiment, a target radio base station 1100 of a radio access network is provided, wherein a wireless radio device is handed over from a source radio base station to said target radio base station 1100. The target radio base station 1100 comprises a processor 1120 and a memory 1130, said memory 1130 contains instructions executable by said processor 1120 (e.g. computer program 1132), whereby said target radio base station 1100 is configured to initiate receiving, from the source radio base station, an enhanced identification request referring to a radio base station in a further radio access network, the enhanced identification request comprises the address of a radio base station which is requesting the identification of said radio base station in the further radio access network. The target radio base station 1100 is further configured to initiate, if the radio base station in the further radio access network is known by the target radio base station as a neighboring radio base station, sending the identification information of said radio base station in the further radio access network to the radio base station which is requesting the identification of said radio base station in the further radio access network, or if the radio base station in the further radio access network is not known by the target radio base station as a neighboring radio base station and if the wireless radio device is handed over to a further target radio base station, forwarding the enhanced identification request to the further target radio base station.

It is to be understood that the structure as illustrated in FIG. 11 is merely schematic and that the target radio base station or eNB 1100 may actually include further components which, for the sake of clarity, have not been illustrated, e.g., further interfaces. For example, multiple network interfaces could be provided which are configured to allow communication with different types of other nodes. Also, it is to be understood that the storage entity may include further types of program code modules, which have not been illustrated.

Moreover, it is to be understood that the above concepts may be implemented by using correspondingly designed software to be executed by one or more processors of an existing device, or by using dedicated device hardware. Also, the nodes as described herein may be implemented by a single device or by multiple devices, e.g., a device cloud or system of cooperating devices.

Figure 12:
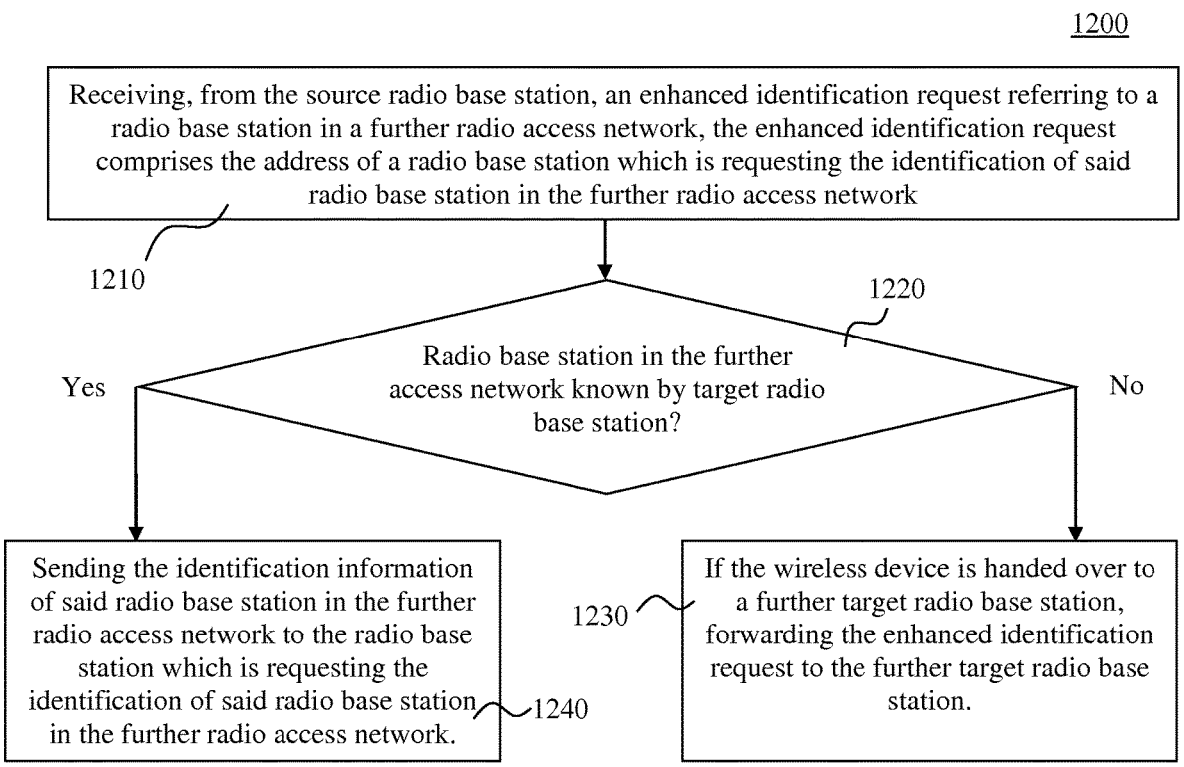
FIG. 12 shows a flowchart for illustrating a further method according to an embodiment.

FIG. 12 shows a flowchart for illustrating a method 1200 which may be utilized for implementing the illustrated concepts in a radio base station of a radio access network. The method may be performed by a target radio base station, wherein a wireless radio device is handed over from a source radio base station to said target radio base station. The method comprising the step 1210 of initiating receiving, from the source radio base station, an enhanced identification request referring to a radio base station in a further radio access network, the enhanced identification request comprises the address of a radio base station which is requesting the identification of said radio base station in the further radio access network. In a further step 1220, it is checked if the radio base station in the further radio access network is known by the target radio base station as a neighboring radio base station. If the check is positive the method comprises a further step 1240 of initiating sending the identification information of said radio base station in the further radio access network to the radio base station which is requesting the identification of said radio base station in the further radio access network. If the radio base station in the further radio access network is not known by the target radio base station as a neighboring base station and if the wireless radio device is handed over to a further target radio base station, then the method comprises the further step 1230 of initiating forwarding the enhanced identification request to the further target radio base station.

Figure 13:
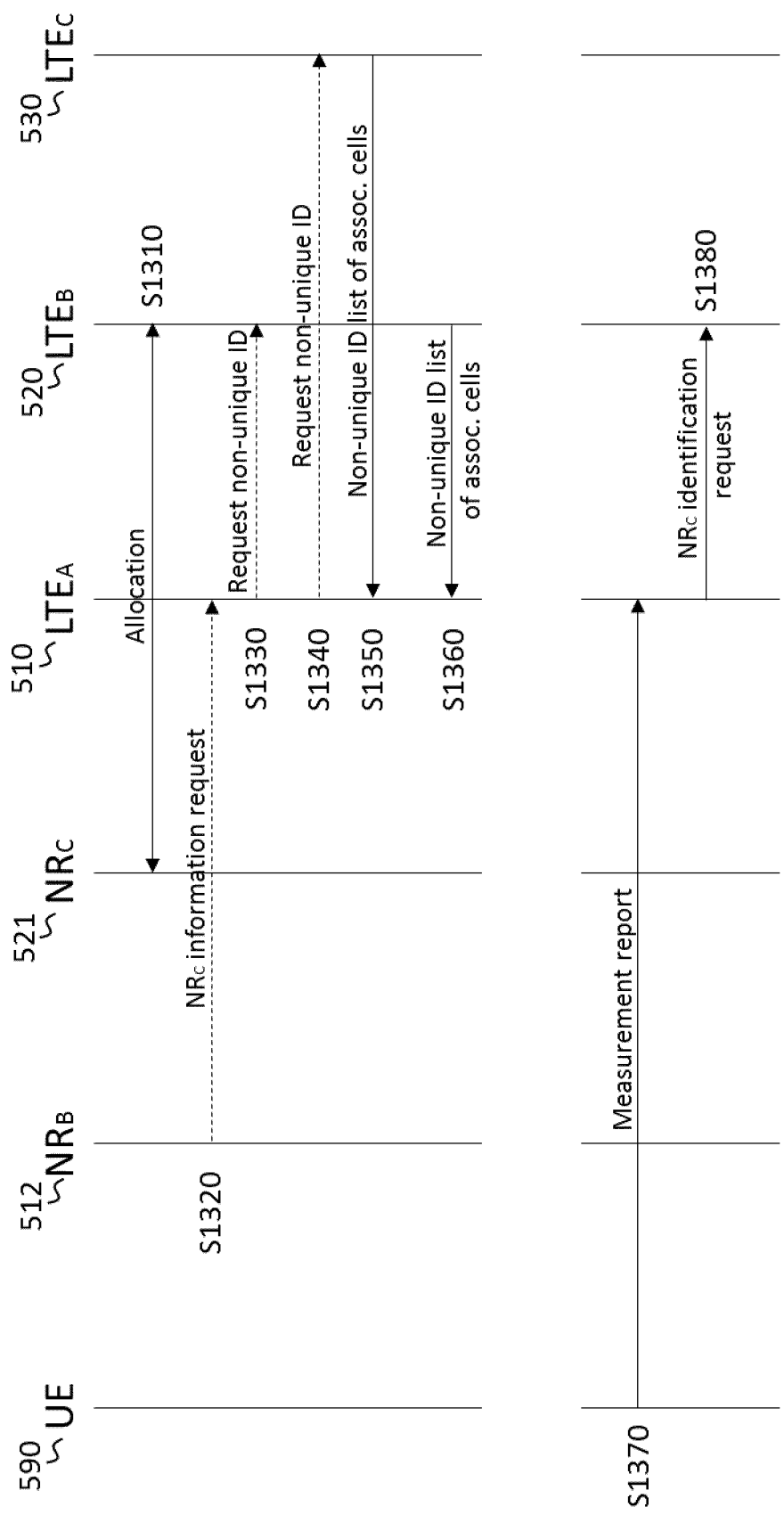
FIG. 13 shows a flowchart for illustrating a further method according to another embodiment.

According to a further embodiment, which is also depicted in FIG. 13, a non-unique identifier is used to reduce the number of identification requests to the neighboring radio base stations. FIG. 13 refers to an example embodiment of FIG. 3. A $NR_C$ radio base station 521 is allocated to the LTE radio base station $LTE_B$ 520. This allocation is depicted as S1310 in FIG. 13. The measurement report in step 1370 which is received by the serving radio base station 510 from the wireless device 590 may comprise a non-unique identity of the radio base station in the further radio access network. This non-unique identity may be a Physical Cell Identity (PCI) which identifies the cell/radio base station in mobility functions such as cell reselection and handover. The PCI has a range of 0 to 503 and it is used to scramble the data to help the wireless terminal to separate information from the different transmitters. Therefore, a PCI is not a unique identifier for a radio base station or cell because there could be more than 504 cells/radio base stations in a wireless communication network. However, it is assumed that in such a scenario, there will be not more than one radio base station in a wireless communication network having the same non-unique identity. This can be done by a pre-configuration and intelligent spreading of the non-unique identities over the whole network architecture. According to said further embodiment a non-unique identity is received from at least one neighboring radio base station of the serving radio base station which is a non-unique identity of radio base stations associated to said neighboring base station. The non-unique identities can be reported as a list to the serving radio base station. This is depicted in FIG. 13 as steps S1350 and S1360 in which $LTE_B$ 520 and $LTE_C$ 530 send non-unique identity lists of associated cells or radio base stations to $LTE_A$ 510. In other words, the neighboring radio base stations of a serving radio base station inform said serving radio base station of non-unique identities of its associated radio base stations. The associated radio base stations can be NR radio base stations or even LTE radio base stations (e.g. LTE relay nodes). The serving radio base station may then store these non-unique identities in relation to the neighboring radio base stations from which the identities have been provided in its memory. This can be done via a table which may be an extension of the NRT. In a next step S1380 of said embodiment the identification request is send to the neighboring stations which already reported the non-unique identity which was also indicated via the measurement report as part of step S1370. In this example $LTE_B$ 520 reported a non-unique dentification of $NR_C$ 521 to the serving radio base station $LTE_A$ 510. No identification request need to be send to $LTE_C$ 530 as this radio base station did not report the non-unique identity of $NR_C$ 521. However, if none of the neighboring radio base stations report said non-unique identity then the $NR_C$ 521 identification request may be send to all neighboring nodes. The step of receiving non-unique identities from the at least one neighbor radio base station may be triggered by the serving radio base station via a request message, as shown in steps S1330 and S1340. It may also be possible that another radio base station, e.g. another radio base station which is allocated to the serving radio base station ($NR_B$ 512 in this example) requested information (step S1320) about $NR_C$ 521 because it may have received some radio signaling from this currently unknown radio base station. According to another embodiment the provisioning and reception of non-unique identities can be done periodically in accordance with a pre-set value. It may also be possible that it has been triggered manually when a new node has been inserted into the network. According to a further aspect the request message is forwarded to further neighboring radio base stations of said at least one neighboring base station as a further propagation step. It is possible to further propagate the request message in the network to further neighboring radio base stations, not known by the serving radio base station. This propagation can be limited to a specific number. The propagation is e.g. necessary if the network is set-up according to the example of FIG. 5 in which no neighboring radio base station of the serving radio base station has information about the specific radio base station $NR_C$ 521. With a propagation of the request message the resulted non-unique identities may be provided to the serving radio base station via the different "hops". In the example of FIG. 5, $LTE_A$ 510 may receive the non-unique identity of $NR_C$ 521 via $LTE_C$ 530 which received this identity from $LTE_B$ 520 via a second propagation of the request message for non-unique identities—as in this scenario $LTE_B$ 520 is not known by $LTE_A$ 510.

The present invention also concerns computer programs comprising portions of software codes or instructions in order to implement the method as described above when operated by at least one respective processing unit of a user device and a recipient device. A carrier may comprise the computer program, wherein the carrier can be one of an electronic signal, optical signal, radio signal, or computer readable storage medium. The computer-readable medium can be a CD-ROM, a DVD, a Blu-ray Disc, a permanent or rewritable memory within the user device or the recipient device or located externally. The respective computer program can also be transferred to the user device or recipient device for example via a cable or a wireless link as a sequence of signals.

Figure 14:
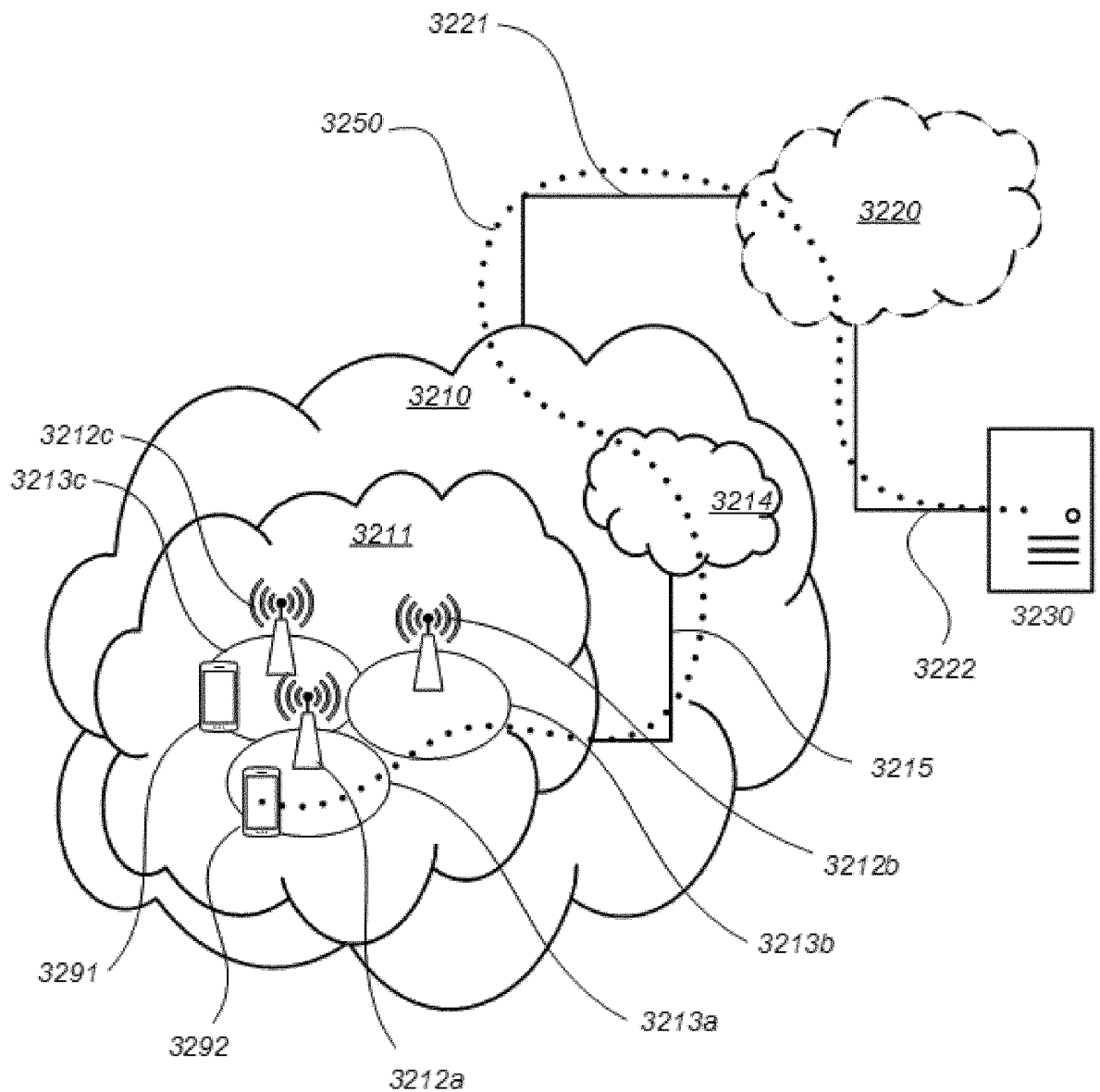
FIG. 14 schematically illustrates a telecommunication network connected via an intermediate network to a host computer.

With reference to FIG. 14, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 14 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 15. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 15) served by the base station 3320. The communication interface 3326 may be configured to facilitate a connection 3360 to the host computer 3310. The connection 3360 may be direct or it may pass through a core network (not shown in FIG. 15) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 15:
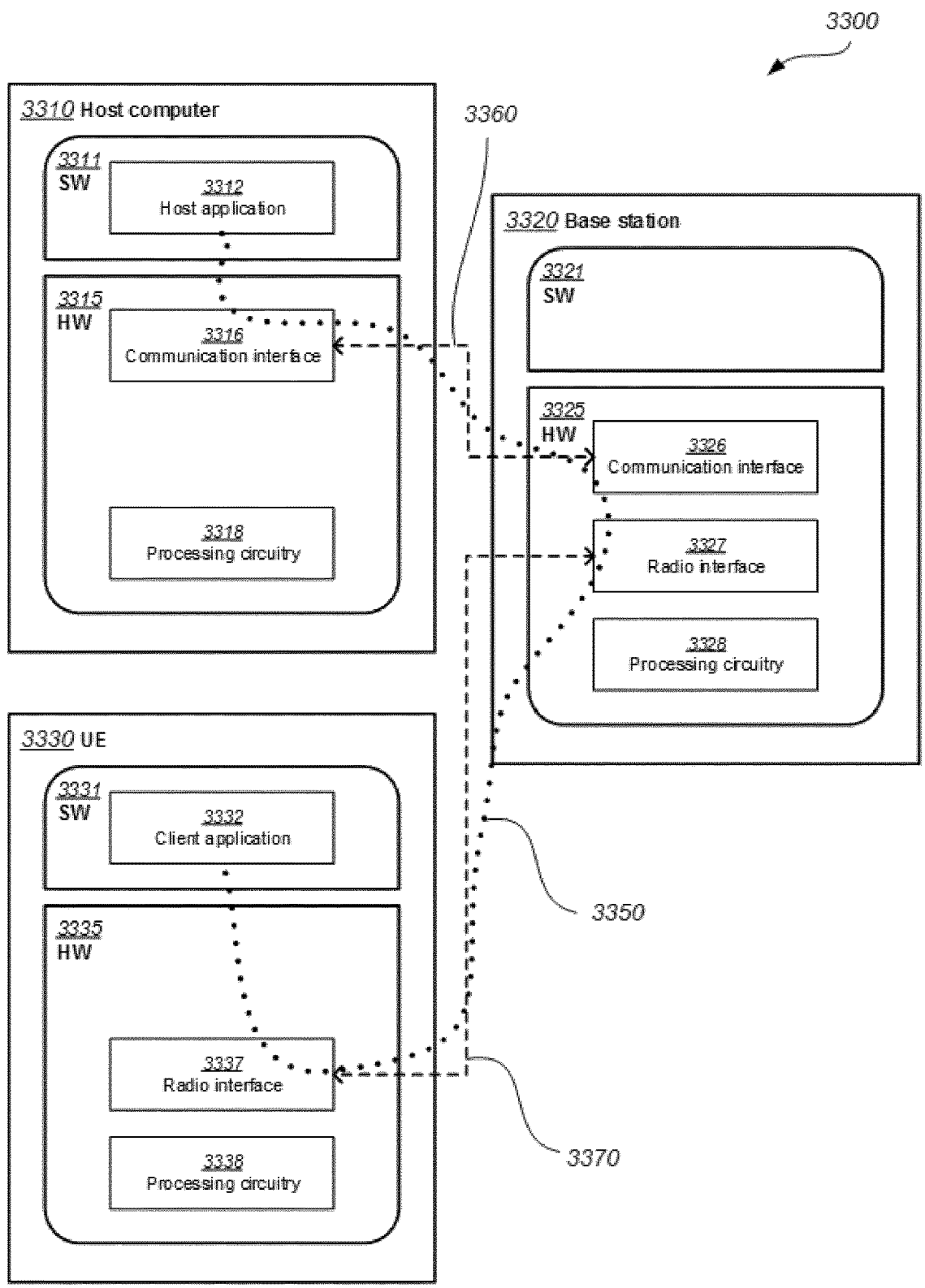
FIG. 15 is a generalized block diagram of a host computer communicating via a base station with a user equipment over a partially wireless connection.

It is noted that the host computer 3310, base station 3320 and UE 3330 illustrated in FIG. 15 may be identical to the host computer 3230, one of the base stations 3212a, 3212b, 3212c and one of the UEs 3291, 3292 of FIG. 14, respectively. This is to say, the inner workings of these entities may be as shown in FIG. 15 and independently, the surrounding network topology may be that of FIG. 14.

In FIG. 15, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the usage of limited resources for the establishment of a neighbor relation between radio base stations and thereby provide benefits such as reduced user waiting time in case the network is adapted with new radio base stations.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

The invention claimed is:

1. A method, in a serving radio base station of a first radio access network, serving a wireless radio device; the method comprising the serving radio base station:
   receiving a measurement report that is based on a reference signal received by the wireless radio device from a radio base station in a further radio access network, and comprises a non-unique identity of the radio base station in the further radio access network, the non-unique identity comprising a physical cell identity (PCI);
   sending an identification request, referring to the radio base station in the further radio access network, to at least one neighbor radio base station of the serving radio base station, wherein the at least one neighbor radio base station reports the same non-unique identity as indicated in the received measurement report;
   receiving, from the at least one neighbor radio base station of the serving radio base station, non-unique identities of radio base stations associated to the at least one neighbor radio base station and information about the identification of the radio base station in the further radio access network;
   establishing a neighbor relation using the information about the identification of the radio base station in the further radio access network, based on received identification information.

2. The method of claim 1, wherein the information about the identification of the radio base station in the further radio access network is a Transport Network Layer address.

3. The method of claim 1, wherein a radio access technology of the first radio access network is different from a radio access technology of the further radio access network.

4. The method of claim 1, further comprising the serving radio base station sending a request for updating a neighbor relation information to the radio base station in the further radio access network.

5. The method of claim 1, wherein the wireless radio device is further served by a second radio base station of a second radio access network.

6. The method of claim 5:
   wherein the second radio base station serves the wireless radio device with user data; and
   wherein the serving radio base station serves the wireless radio device with control data only.

7. The method of claim 5, wherein the measurement report is received from the second radio base station.

8. The method of claim 5, wherein a radio access technology of the first radio access network is different from a radio access technology of the second radio access network.

9. The method of claim 5, further comprising the serving radio base station sending a request for updating the neighbor relation information to the second radio base station.

10. The method of claim 1, wherein the connection between the serving radio base station and the wireless radio device is a Radio Resource Control (RRC) connection.

11. The method of claim 1, wherein the serving radio base station receives a negative acknowledgement from the at least one neighbor radio base station, if the radio base station in the further radio access network is not known by the at least one neighbor radio base station.

12. The method of claim 1, wherein the receiving non-unique identities from the at least one neighbor radio base station is triggered by the serving radio base station via a request message.

13. The method of claim 1, wherein the serving radio base station receives non-unique identities of radio base stations associated to the at least one neighbor radio base station periodically.

14. A serving radio base station of a first radio access network, serving a wireless radio device, the serving radio base station comprising:
   processing circuitry;
   memory containing instructions executable by the processing circuitry whereby the serving radio base station is operative to:
   receive a measurement report that is based on a reference signal received by the wireless radio device from a radio base station in a further radio access network, and comprises a non-unique identity of the radio base station in the further radio access network, the non-unique identity comprising a physical cell identity (PCI);
   send an identification request, referring to the radio base station in the further radio access network, to at least one neighbor radio base station of the serving radio base station, wherein the at least one neighbor radio base station reports the same non-unique identity as indicated in the received measurement report;
   receive, from the at least one neighbor radio base station of the serving radio base station, non-unique identities of radio base stations associated to the at least one neighbor radio base station and information about the identification of the radio base station in the further radio access network; and
   establish a neighbor relation using the information about the identification of the radio base station in the further radio access network, based on received identification information.

15. The serving radio base station of claim 14, wherein a radio access technology of the first radio access network is different from a radio access technology of the further radio access network.

16. The serving radio base station of claim 14, wherein the wireless radio device is further served by a second radio base station of a second radio access network.

17. The serving radio base station of claim 16:
   wherein the second radio base station serves the wireless radio device with user data; and
   wherein the serving radio base station serves the wireless radio device with control data only.

18. The serving radio base station of claim 16, wherein the instructions are such that the serving radio base station is operative to send a request for updating the neighbor relation information to the second radio base station.

19. A non-transitory computer readable recording medium storing a computer program product for controlling a serving radio base station of a first radio access network, serving a wireless radio device, the computer program product comprising program instructions which, when run on processing circuitry of the serving radio base station, causes the serving radio base station to:
   receive a measurement report that is based on a reference signal received by the wireless radio device from a radio base station in a further radio access network and comprises a non-unique identity of the radio base station in the further radio access network, the non-unique identity comprising a physical cell identity (PCI);
send an identification request, referring to the radio base station in the further radio access network, to at least one neighbor radio base station of the serving radio base station, wherein the at least one neighbor radio base station reports the same non-unique identity as indicated in the received measurement report;
receive, from the at least one neighbor radio base station of the serving radio base station, non-unique identities of radio base stations associated to the at least one neighbor radio base station and information about the identification of the radio base station in the further radio access network; and
establish a neighbor relation using the information about the identification of the radio base station in the further radio access network, based on received identification information.

\* \* \* \* \*